B. S. BENSON.
Plow.
No. 162,015. Patented April 13, 1875.
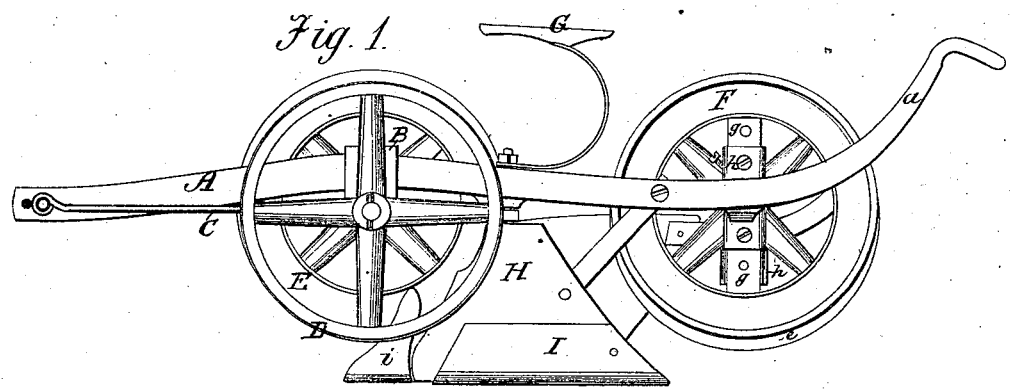
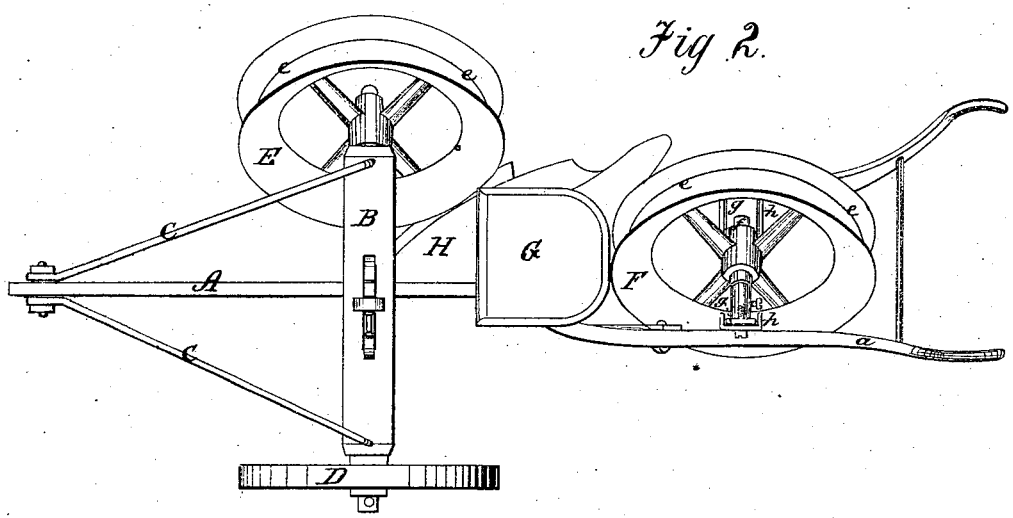
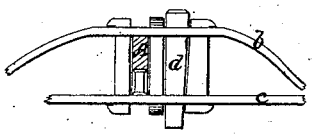
WITNESSES:
W. W. Hollingsworth
Solon C. Kenon
INVENTOR:
Benj. S. Benson
BY
Munn & Co
ATTORNEYS.

UNITED STATES PATENT OFFICE.

BENJAMIN S. BENSON, OF BALTIMORE, MARYLAND.

IMPROVEMENT IN PLOWS.

Specification forming part of Letters Patent No. 162,015, dated April 13, 1875; application filed January 16, 1875.

*To all whom it may concern:*

Be it known that I, BENJAMIN S. BENSON, of Baltimore city, State of Maryland, have invented a new and Improved Plow; and I do hereby declare that the following is a full, clear, and exact description of the same, reference being had to the accompanying drawing, forming a part of this specification, in which—

Figure 1 is a side elevation; Fig. 2, a plan view; Fig. 3, a detail of the adjustment of the wheel-axle to the beam.

This invention relates to certain improvements in plows; and it consists, in combination with a plow, of wheels set at an inclination to the vertical plane, and provided with a groove upon their peripheries, which receives and runs upon the projecting edge of the unplowed ground next to the furrow, for the purpose of regulating the furrow, guiding the plow, and lightening the draft. It also consists in the peculiar construction and arrangement of the frame and plow, in combination with the wheels, as hereinafter described and claimed.

In the drawing, A represents the beam, which is extended at $a$ to form one of the handles. B is a short axle, formed of upper and lower bars $b$ $c$, which is attached to the beam by means of the gibs and keys $d$, in such a manner as to give it a longitudinal adjustment transversely to the beam, the gibs and keys allowing the plow to be lowered or raised at will. C are brace-rods, which hold the said axle. D is a wheel, attached to one end of the said axle, which runs upon the unplowed ground, and E is another wheel upon the opposite end of the axle, which is inclined about thirty-five degrees to the vertical plane, so as to allow an angular groove, $e$, upon its periphery to receive and run upon the salient or projecting edge of the unplowed ground. F is a second inclined wheel placed in the rear of the plow, which has a similar groove, that runs upon the projecting edge upon the land-side of the plow. Said wheel revolves upon a shaft, $f$, which is held by means of binding-screws in the adjustable supports $g$. Said supports are provided with holes, and slide in grooved pieces $h$, also provided with holes, by means of which the plow is raised or lowered for deep or shallow plowing. The plow is also shifted sidewise, more or less, toward the land, by shifting loose washers on shaft $f$, on either side of the wheel. G is a seat for the driver, and H is the plow proper, which consists of the ordinary mold-board, provided with a colter and gouge-shaped point, $i$. On the opposite side of the plow is a detachable heel-piece, I, to be used only in running the first furrow.

The operation of this plow is as follows: The first furrow having been plowed, the detachable heel-piece I is taken off. Now, as the plow runs the next furrow, the first inclined wheel E runs with its angular groove directly upon the salient or projecting edge of the list, or that which constituted the land-side, for the preceding furrow, and determines the width of the furrow or list. This said wheel prevents the cutting-edge of land-side from pressing against the salient edge, and also assists wheel F in preventing the share point and edge from pressing on the bottom of the furrow. The second inclined wheel F, which is in the rear of the plow, runs with its angular groove upon the salient or projecting edge of the land-side of the ground, and takes the place of the heel by relieving the land-side of the plow and bottom of the same of the sliding friction, and converts the same into rolling friction, by means of which arrangement the plow is made to run a furrow of uniform depth and width, is made self-guiding, and, by reason of the conversion of the sliding into rolling friction, is made to run with a correspondingly-lighter draft.

Having thus described my invention, what I claim as new is—

1. The combination, with a plow, of an inclined wheel, provided with a circumferential groove that receives and runs upon the projecting edge of the unplowed ground, substantially as and for the purpose described.

2. The combination, with the plow-beam A and the axle B, of the inclined grooved wheel E, for the purpose of regulating the furrow, substantially as described.

3. The combination, with a plow, having a detachable heel-piece, of the rear wheel F, inclined to the vertical plane, and constructed as described, with a circumferential groove for the purpose of lightening the draft and rendering the plow self-guiding, substantially as described.

BENJAMIN S. BENSON.

Witnesses:
 LEVI TISCHMEYER,
 JOSEPH B. CLAYTON.